United States Patent [19]

Blumenau et al.

[11] 4,069,923
[45] Jan. 24, 1978

[54] BUOYANCY ELEVATOR FOR MOVING A LOAD IN AN INDUSTRIAL FACILITY SUCH AS A NUCLEAR POWER PLANT

[75] Inventors: Leif Blumenau, Brooklyn; Frank John Pignata, Jr., Staten Island, both of N.Y.

[73] Assignee: Ebasco Services Incorporated, New York, N.Y.

[21] Appl. No.: 533,186

[22] Filed: Dec. 16, 1974

[51] Int. Cl.² ...................... B65G 65/30; G21C 19/32
[52] U.S. Cl. ................................ 214/17 B; 114/16 E; 114/52; 176/30; 187/1 R; 187/17; 187/67
[58] Field of Search ................... 187/1, 15, 17, 28, 42, 187/67, 68; 214/18 N, 17 B, 16 B; 114/16 E, 52, .5 R, .5 T; 176/27–30; 61/69 R, 69 A

[56] References Cited

U.S. PATENT DOCUMENTS

| | | | |
|---|---|---|---|
| 3,018,850 | 1/1962 | Fehlmann | 187/17 |
| 3,282,238 | 11/1966 | Tucker | 114/52 |
| 3,344,614 | 10/1967 | Byck | 61/69 R |
| 3,621,802 | 11/1971 | McGinn | 114/16 E |
| 3,623,443 | 11/1971 | Luther | 114/16 E |
| 3,713,411 | 1/1973 | Bordessoule | 114/16 E |
| 3,716,009 | 2/1973 | Strickland | 114/16 E |
| 3,744,593 | 7/1973 | Jones | 187/17 |
| 3,760,753 | 9/1973 | Mertens | 114/16 E X |
| 3,819,066 | 6/1974 | Jones | 187/68 X |
| 3,828,565 | 8/1974 | McCabe | 114/.5 T X |

FOREIGN PATENT DOCUMENTS

| | | | |
|---|---|---|---|
| 322,792 | 2/1903 | France | 187/17 |

*Primary Examiner*—Evon C. Blunk
*Assistant Examiner*—James L. Rowland
*Attorney, Agent, or Firm*—Kenyon & Kenyon, Reilly, Carr & Chapin

[57] ABSTRACT

An elevator for transporting a load between upper and lower elevations includes a shaft containing liquid therein between the elevations. A buoy accommodates the load to be moved and transports the same within the shaft. A buoyancy control controls the buoyancy of the buoy to cause it to ascend and descend in the shaft. The buoyancy control includes a chamber which is formed in the buoy and which communicates with the liquid in the shaft. A gas control supplies gas under pressure to the chamber for expelling liquid therefrom whereby the buoyant forces acting on the buoy are increased and for venting the gas in the chamber for causing liquid to enter the chamber whereby the buoyant forces acting on the buoy are reduced. The gas control includes descent/ascent protection means for limiting the amount of gas vented from/to the chamber thereby limiting the maximum degree of negative/positive buoyancy of the buoy.

The elevator is especially adaptable for moving casks utilized in the nuclear power industry for shipping spent nuclear fuel elements.

49 Claims, 16 Drawing Figures

BUOYANCY ELEVATOR FOR MOVING A LOAD IN AN INDUSTRIAL FACILITY SUCH AS A NUCLEAR POWER PLANT

BACKGROUND OF THE INVENTION

Our invention relates to an elevator for moving heavy loads between respective elevations in an industrial facility and a method of operating the elevator. The elevator according to the invention is a buoyancy device which moves in a shaft of liquid between upper and lower elevations.

The idea of elevating and lowering a body in liquid by changing buoyance has been applied in the chemical and metallurgical industries as disclosed for example in U.S. Pat. No. 2,305,823. This reference discloses an apparatus for raising and lowering a vessel for carrying chemical or metallurgical elements.

U.S. Pat. No. 2,470,313 relates to a fluid mechanism for producing mechanical movements wherein a buoyancy elevator is used to pump liquid from one container into another container.

In the medical arts, U.S. Pat. No. 3,801,995 teaches a bath unit for bathing patients wherein a platform is raised and lowered by buoyancy forces. Still other references which disclose the utilization of buoyancy forces to move a body in a liquid are: U.S. Pat. No. 2,968,929 which is directed at an arrangement for raising and lowering massive bodies such as ships; U.S. Pat. No. 3,276,211 relating to a floating drydock; U.S. Pat. No. 3,171,376 which is directed to a bathyscaphe apparatus; and U.S. Pat. No. 2,887,977 which is also directed to a bathyscaphe type apparatus.

The elevator of our invention is especially adaptable for moving casks utilized in the nuclear power industry for shipping irradiated nuclear fuel elements.

The fuel elements commonly employed in BWRs (Boiling Waters Reacters) or PWRs (Pressurized Water Reactors) comprise a fuel assembly unit containing a plurality of long thin fuel rods. The fuel rods comprise a plurality of radioactive uranium compound pellets packed within a steel tube clad with zirconium or a zirconium alloy. The fuel elements become spent requiring replacement and reprocessing when their tubing springs a leak or their reactivity falls below a desired level.

In the current practice, the fuel assembly to be replaced and reprocessed is lifted out of the reactor core and moved through a connecting channel into an adjacent spent fuel storage pool of a fuel handling building where it is cooled down for some time. Next, a suitable shipping cask, usually made of lead or other good shielding material, is removed from its transport vehicle stationed inside the fuel handling building, lifted to the top floor of the fuel handling building, then carried across the top floor and lowered into the spent fuel storage pool, the fuel assembly loaded into the cask, the cask sealed, lifted out of the storage pool to the top floor, lowered to the decontamination area, carried to the transport vehicle, and there secured for conveyance to the reprocessing plant.

At the reprocessing plant, a similar cask transport process is carried out before the fuel rods can be separated from the assembly and taken apart, the radiated pellets removed, the fissionable material separated from the fission products and prepared for forming into new pellets.

As is known, the fuel storage pool of a nuclear power plant and similar pools at fuel processing plants contain the highest quality demineralized water (same water quality as in the reactor). However, the fuel pool water will be radioactively contaminated due to leaking fuel rods despite constant purification. Normally the fuel pool water is reprocessed with the twofold purpose of 1, keeping the radioactivity level within bounds and 2, maintaining a high water quality.

Submerging the cask into the spent fuel pool for fuel transfer operation may introduce to the pool water a large number of foreign substances, such as oil, dust particles, and paint scale. Thus, it becomes extremely difficult for the normal fuel pool purification system to reprocess this water to restore the extremely high water quality normally used for this purpose.

Before the loaded cask can be brought out from the nuclear power station it must be decontaminated if it has been exposed to radioactively contaminated fuel pool water. Demineralized water, together with detergents, are used for cask wash-down. The waste water now containing detergents and radioactive contaminants, in addition to all the other foreign substances above, is also reprocessed (by a special radwaste system) although the water quality may not be restored to the same high level as that of the fuel pool water.

The burden of decontaminating the cask can cause extreme toil and the risks for radiation exposure for the personnel involved is great.

Moreover, contaminated water pools cause contamination of overhead cranes, sheaves and cables used for hoisting the cask in the out of the pool. Decontamination of such equipment is extremely burdensome.

Thus, there is a need in the art for a cask handling system that would avoid exposure of the cask exterior to possibly contaminated pool water as well as the sheaves and cables of the cask crane equipment. Also, relative to cask handling, there is a need to provide a cask handling system which will preclude the danger of accidental cask droppage into the reservoir wherein the spent fuel operation is performed.

It is anticipated that future shipping casks will have a loading capability of 12 to 15 PWR elements or 26 to 32 BWR elements. These casks will have an outer diameter of about 10 feet and a length of more than 20 feet and weigh nearly 125 tons when loaded. In the past, handling methods for shipping casks provided only one line of safety by employing a single load path through an overhead crane to lift and move the cask in the fuel handling area. The frequency with which casks have been thereby handled, coupled with crane performance characteristics, could result in a significant probability that a cask will drop in or into the spent fuel pool. Should the hoist cables fail, the falling cask could have catastrophic effects such as; crushing fuel assemblies stored in the pool, causing release of radioactive gases or cracking of the pool floor, causing a drain of the shielding pool water and exposure of the radioactive fuel assemblies.

In an effort to remedy the situation, cask loading pits were introduced. The cask loading pit is the full depth of the spent fuel pool and is connected thereto by means of a transfer canal. Since the potential drop height, in the case of hoist failure, in some instances can be a height corresponding to the depth of the cask loading pit which could exceed 40 feet, the integrity of the shipping cask would not be guaranteed.

Thus, as seen from the foregoing, cask handling arrangements of the prior art could present first the problem or requiring that the cask itself be immersed in the spend fuel pool making it necessary to wash the cask down to decontaminate the cask exterior to remove radioactive residue ahhering thereto because of its immersion in the spent fuel reservoir and second, the danger of cask droppage with its possible contaminant catastrophic effects.

SUMMARY OF THE INVENTION

In view of the foregoing, it is an object of our invention to provide a cask handling system which eliminates the foregoing disadvantages associated with the prior art. Another object of the invention is to provide an elevator and a method of operating the elevator for moving loads between upper and lower elevations in an industrial facility wherein careful control of the movement of the elevator is provided.

A primary function of the cask handling system according to the invention is to move the nuclear fuel shipping cask from a position at the upper elevation of the cask loading pit safely to a lower elevation position at the pit bottom where spent fuel assemblies can be brought into the cask under a depth of shielding water, cap the cask with a shield cover and then returning the cask to the upper elevation.

The cask handling system for transporting a nuclear fuel shipping cask between upper and lower elevations in a nuclear facility includes as a feature a shaft for containing a shaft of liquid therein extending between these elevations. A buoy for accommodating the cask and for transporting the same between the upper and lower elevations is provided as are means for controlling the buoyancy of the buoy to cause the same to ascend and descend in the shaft.

By moving the cask with the buoy, it is unnecessary to utilize a hoist system to move the cask between the above-mentioned elevations, thereby eliminating the danger that the cask will accidentally drop through the distance corresponding to the pit depth. Safe handling of the cask and the integrity of the cask is thus guaranteed.

A primary function of a preferred embodiment of the cask handling system according to the invention is to render decontamination of the cask unnecessary. Therefore, it is a feature of this embodiment to provide a cavity within the buoy for receiving the cask. A removable seal seals the cavity when the cask is in place in the buoy and prevents penetration of the liquid of the shaft into the cavity during the travel of the buoy between the upper and lower elevations. Thus, the cask can be lowered into a radioactive contaminated water without the exterior surface of the cask being brought into contact therewith.

According to still another feature of the invention, control means are provided for limiting the maximum degree of negative and positive buoyancy to thereby minimize the forces acting on the buoy when the buoy reaches its end positions.

Although the invention is illustrated and described herein as a buoyancy elevator for moving a load in an industrial facility such as a nuclear power plant, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 3 is a cut-away view of a pertinent portion of the buoy to show how the air vent supply hose is accomodated therein.

DESCRIPTION OF THE PREFERRED EMBODIMENTS OF THE INVENTION

Figure 1:
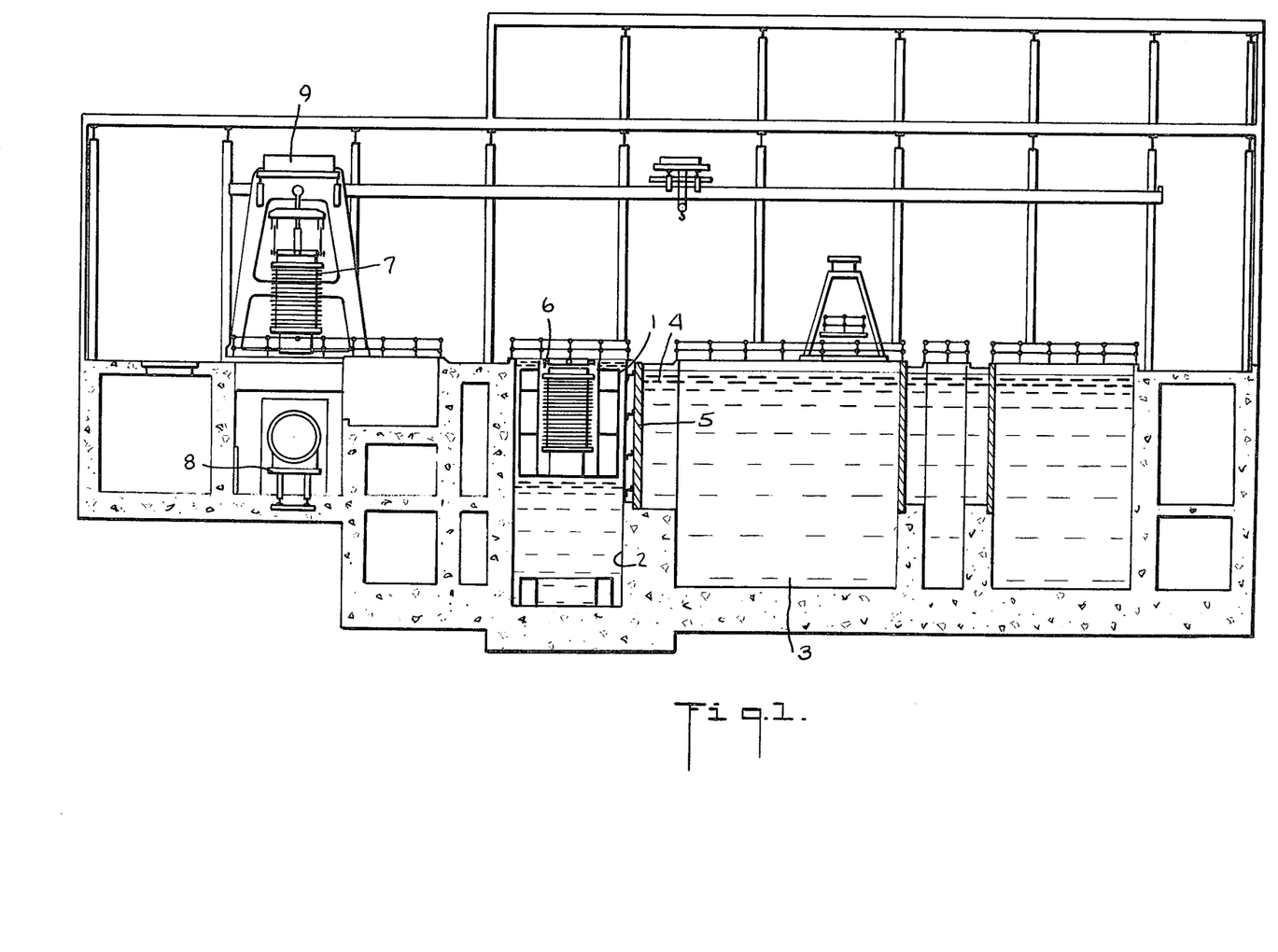
FIG. 1 is an elevation view partial section of a nuclear facility equipped with the cask handling system according to the invention.

The nuclear facility shown in FIG. 1 incorporates the buoyancy elevator according to the invention. The buoyancy elevator is in the form of a submersible buoy 1 located in a fuel cask loading pit 2 which constitutes the shaft in which the buoy 1 moves between upper and lower elevations which correspond to the docking and loading positions, respectively. The pit 2 is lined with steel and is connected to a fuel storage pool 3 by means of a transfer canal 4 which incorporates a baffled gate 5. The gate 5 normally closes off the pit 2 from the pool 3. The baffle attached to the gate provides a flush closure to the shaft vertical wall surface.

The buoy 1 is used for raising and lowering the cask 7 in the pit 2. By way of example, the cask 7 can be approximately 10 feet in diameter, 20 feet in length and weigh when empty 100 tons. When filled with spent fuel elements weighing approximately 20 tons and when containing approximately 5 tons of water which is used to shield the spent fuel elements, the cask with its contents weighs approximately 125 tons.

The submersible buoy 1 includes a dry cavity 6 for receiving the fuel shipping cask 7 therein. The empty cask 7 can be delivered to the nuclear facility by railroad flat car 8. The empty cask 7 is lifted from the flat car 8 by an overhead gantry crane 9 and transported in a vertical position to a location above the pit 2 where the cask 7 is brought into alignment with the submersible buoy 1.

Figure 2:
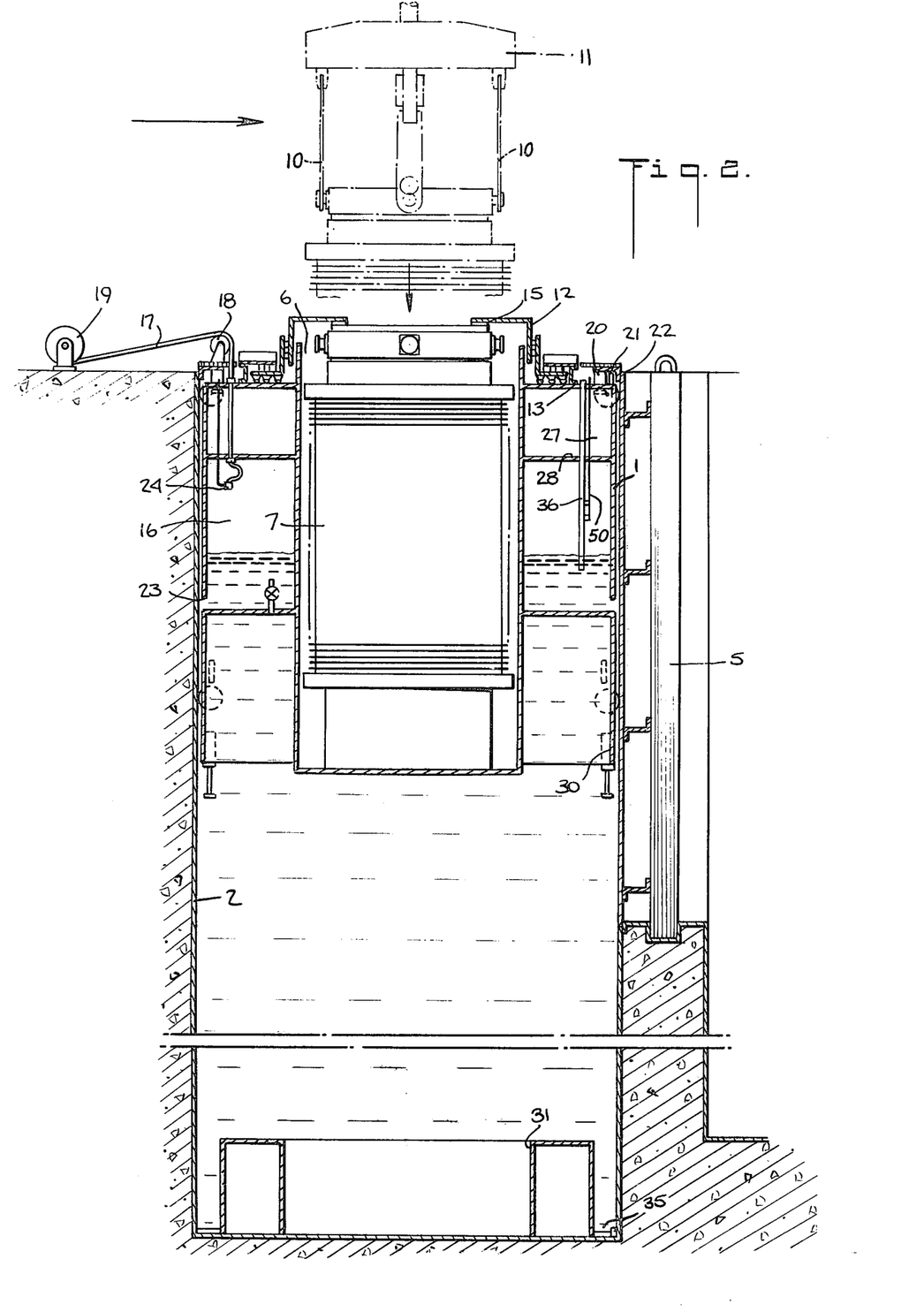
FIG. 2 is an elevation view of the cask handling system showing details of the buoy.

FIG. 2 shows the buoy at the docking position. The cask is lowered by the crane 9 into the dry cavity 6 of the buoy 1 as shown in phantom also in FIG. 2. The cask is held by the crane 9 by means of lifting trunnions 10 at each of the sides of the cask 7 at its upper end. When the empty cask 7 is brought in, the buoy 1 is in its upper docking position. After the cask 7 has been loaded into the buoy cavity 6 by means of the crane 9, the crane hook assembly 11 is released. The buoy 1 now carries the cask 7 still in the docking position.

Once lowered into the cavity 6 of the buoy, a cover (not shown) is removed from the end of the cask 7 adjacent a soft gasket 15 thereon. Thereafter, the cask 7 is sealed with respect to the buoy 1 by an annular seal cap 12 which is placed over the opening of the cask 7 and secured against the soft gasket 15. The seal cap 12 is part of a seal arrangement which prevents water from entering the dry cavity 6 of the buoy 1 and which is described in detail below with reference to FIG. 14. The seal cap 12 seals off the cask exterior by bridging across the annulus between the cask and the buoy roof 13 and leaves the cask opening uncovered.

A separate temporary lid 14 (FIG. 7) for covering the cask opening may be placed on a seat provided by the cask interior flange to prevent water from rushing into the cask interior when the buoy submerges. The flow of water into the cask is undesired because it will upset the sensitive equilibrium between the upward and downward forces as the buoy fully submerges.

The buoy is moved from the docking position to the loading position by decreasing the buoyancy thereof. The force of buoyance on the buoy 1 is primarily determined by the quantity of water within an annular chamber 16 of the buoy 1. Thus, partially flooding the chamber 16 decreases the force of buoyancy; whereas, displacing water from the chamber 16 by compressed air, increases the force of buoyancy.

As shown in FIG. 2, an air vent/supply hose 17 is provided for venting or supplying air from or to the buoy chamber 16. The hose 17 is flexible so that it follows the buoy 1 on its travel. The hose 17 is handled by means of a pulley 18 and a spring loaded hose reel 19.

The force of buoyancy resulting from the volume of water displaced by air from the buoy 1 enables the buoy 1 to support the weight of an empty or unloaded cask. If the cask is empty at the beginning of a cycle of operation, the buoyancy force of the buoy urges the buoy upwardly against hydraulic snubbers 20 (FIG. 3) and the upward force is sensed by the upper load sensors 21 (FIG. 2). The hydraulic snubbers 20 and load sensors 21 are mounted on a support flange at a location above the buoy on the operating floor 22 of the nuclear facility.

By venting air through the air vent/supply hose 17, the volume of air within the chamber 16 is reduced and the level of water within the chamber 16 increases by flow through the port openings 23. Once the load sensors 21 indicate that the upward force has been reduced to zero, the buoy has assumed the state of neutral buoyancy and thereafter any further venting of air and entry of water will result in a degree of negative buoyancy which will cause the buoy to begin to sink downwardly into the pit 2. The system is made fail-safe at this point of operation since the maximum level that the water can rise within the buoy is controlled by the nozzle opening at the lower end 24 of air vent/supply hose 17. Thus, if the water rises above the nozzle opening of the hose, no further escape of air from the buoy can occur and the air remaining becomes trapped in the upper portion of the buoy chamber 16. Descend protection means can therefore be provided by placing the nozzle opening 24 at a predetermined elevation in the chamber 16. The trapped air limits the maximum degree of negative buoyance which can occur and therefore limits the rate of descent of the buoy.

Figure 4:
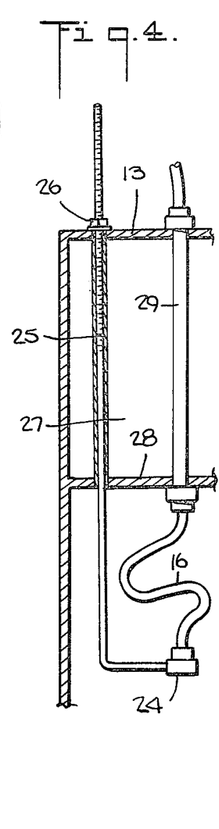
FIG. 4 is a fragmentary vertical section view of the apparatus for limiting the maximum level of liquid within the buoy.

Referring to FIG. 4, the maximum degree of negative buoyancy can be set for the buoy by adjusting the height of the hose nozzle 24 in the chamber 16 by changing the elevation of the threaded hose support 25 by adjusting the nut 26 at the roof 13 of the buoy.

The buoyancy condition achieved by venting air from or, for that matter, supplying compressed air to the chamber 16 establishes the static force which acts on the buoy. The buoy motion is not solely a function of the buoyancy and there are other forces which act on the buoy during its movement to and from the loading position which deserve mention.

For example, viscous shear drag forces act along the vertical surfaces of the buoy and are a function of the space between the buoy and the shaft and approach infinity for zero slot-width. The minimum slot-width is estimated to be approximately one inch. The viscous drag force has a relatively small magnitude compared with the force acting on the buoy to resist motion due to dynamic pressure build-up.

Dynamic pressure build-up, in turn, is caused by viscous flow in the contour between the buoy and the walls of the shaft and provides a major part of the resisting forces acting against buoy motion.

Still another effect influencing the movement of the buoy in the shaft is brought about because the air remaining in the annular chamber 16 of the buoy during the buoy's descent becomes compressed therefore increasing the negative buoyancy of the buoy. Thus, the buoy loses buoyancy due to the pressurization of the air cushion in the annular chamber 16 as the buoy travels downward and can thus acquire an undesirable speed. This situation can be remedied by providing an additional chamber 27 which is not affected by external water pressure. This is accomplished by adding the horizontal plate 28 shown in FIG. 2. The volume above the plate 28 is then the stationary buoyancy volume compartment and the volume compartment below the plate 28 is the controllable buoyancy volume. The air vent/supply tubes and overflow tubes penetrate compartment 27 is sealed off sleeves 29 (FIG. 4). If desired, air vent/supply tubes can also be supplied to the additional chamber so that the air volume of both compartments 16 and 27 can be controlled enabling the buoy to accommodate a wider range of loads.

FIGS. 5 to 12 illustrate the operating sequence for the buoy in moving a cask to and from the docking position.

Figure 5:
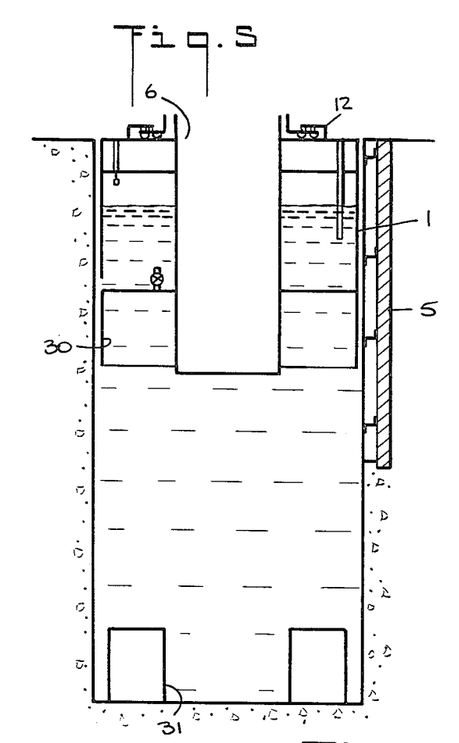
FIGS. 5 to 12 illustrate the operating sequence for the buoy in moving the cask to and from the docking position.
Figure 6:
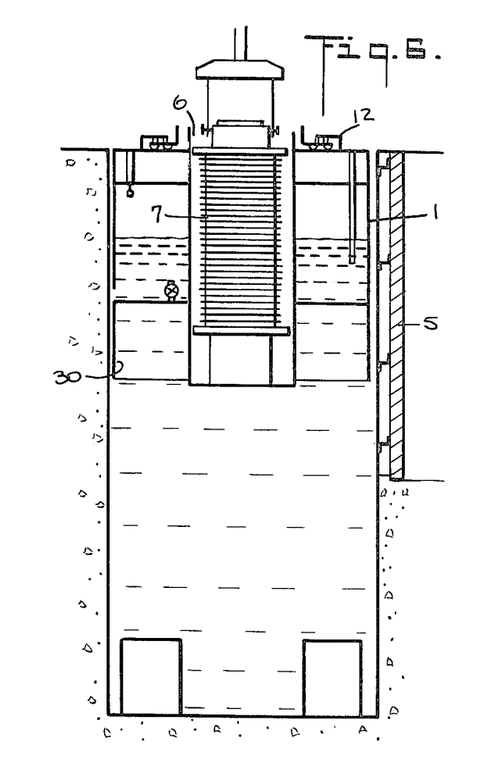

FIG. 5 shows the buoy at the docking position ready to receive the empty cask 7. The cask is lowered by the crane 9 into the dry cavity 6 of the buoy 1 as shown in FIG. 6. After the cask 7 has been loaded into the buoy cavity 6 by means of the crane 9, the crane hook assembly 11 is released. The buoy 1 now carries the cask 7 still in the docking position.

Once lowered into the cavity 6 of the buoy, a cover (not shown) is removed from the end of the cask 7 and the cask 7 is sealed with respect to the buoy 1 by the annular seal cap 12. The separate temporary lid 14 for covering the cask opening may be inserted onto a seat provided by the cask interior flange. Lid 14 prevents water from rushing into the cask interior when the buoy submerges.

Figure 7:
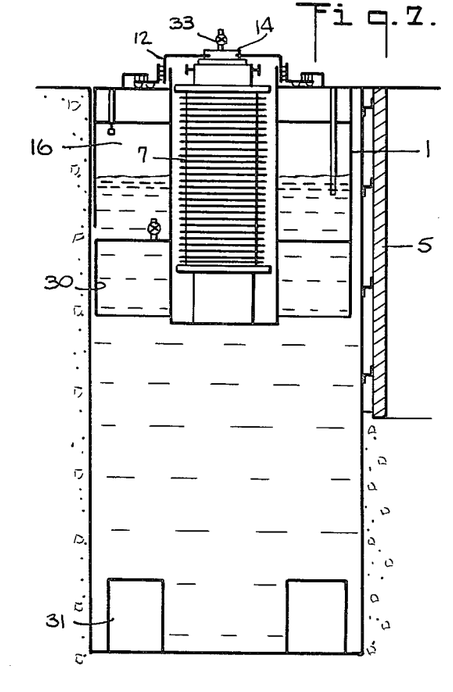

The buoy is moved from the docking position shown in FIG. 7 toward the loading position by decreasing the buoyancy thereof by partially flooding the chamber 16 as described above.

Figure 8:
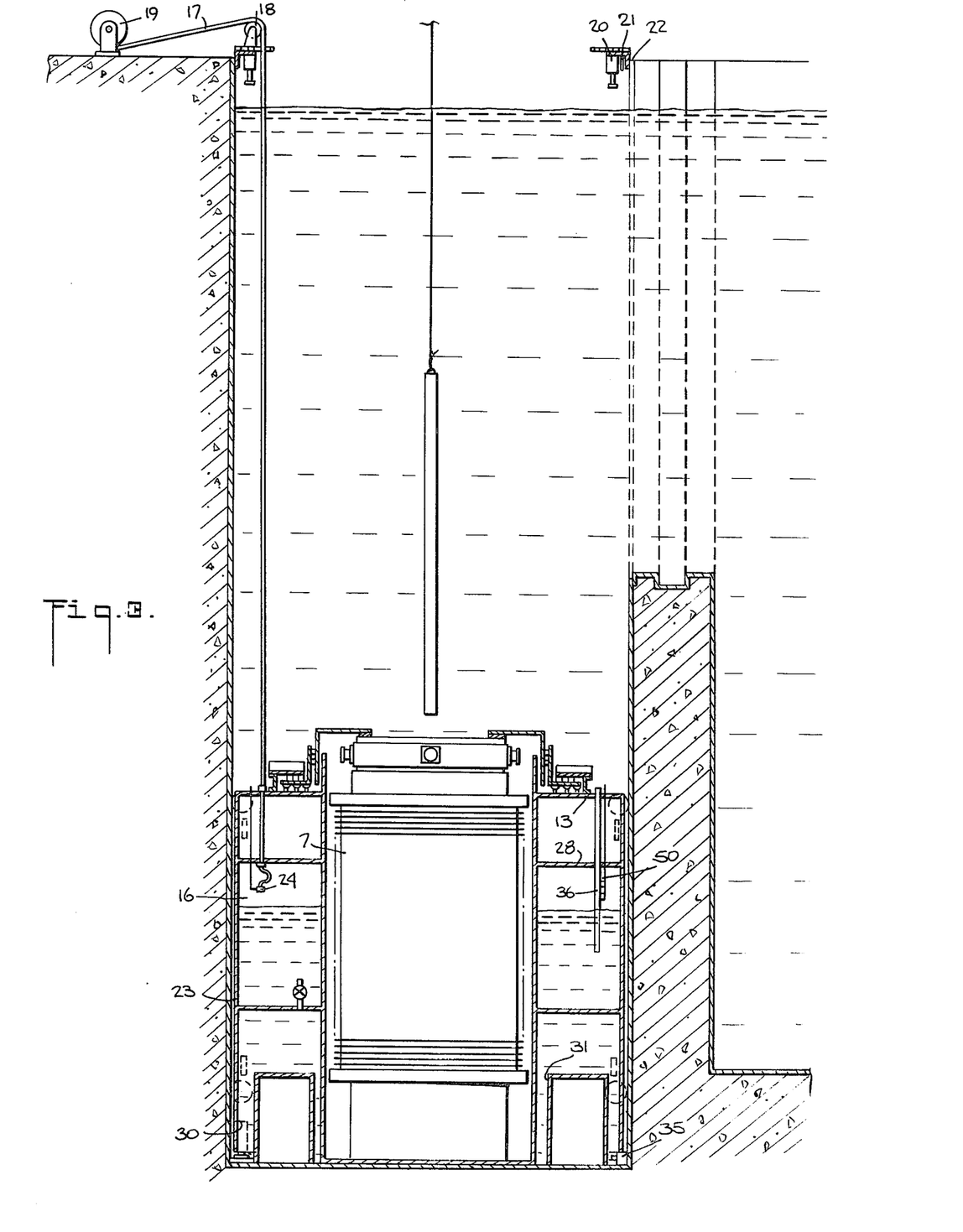

FIG. 8 shows the buoy approaching the loading position at the bottom of the pit. The lower portion of the buoy is configured to define an annular cylinder 30 which receives therein the annular piston-like structure 31 arranged at the bottom of the pit 2. The annular structure 31 can be made of concrete or, preferably, the structure 31 can be made of stainless steel sheets fastened to the steel lining of the pit 2. The action causes a flow of water to occur in an outward direction as indicated by arrows 32. An especially strong dynamic pressure build-up is achieved which acts as a cushion to reduce the impact of the buoy at the bottom of the pit. The piston-like structure 31 and the annular cylinder 30 thus conjointly define dash-pot means for decelerating the buoy 1 when it reaches the loading position.

Figure 9:
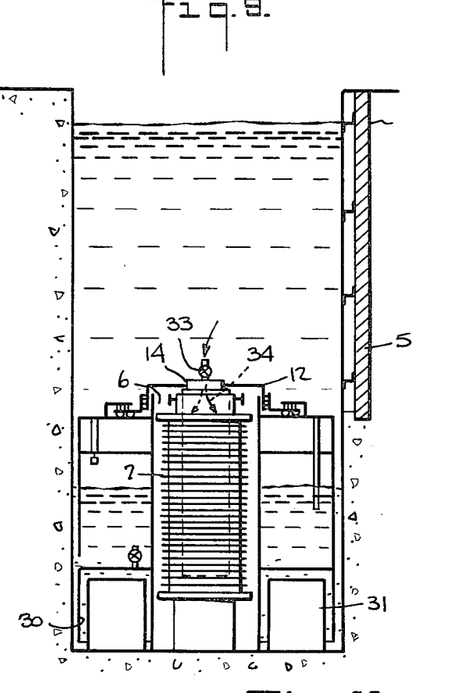

FIG. 9 shows the buoy at the loading position. Preparatory to opening the lid 14, flooding valve 33 is opened to admit water from the pit into the cask interior as represented by arrows 34 thereby flooding the cask interior. After the pressure has been thus equalized, the lid 14 can be removed to render the cask ready to receive spent fuel elements therein.

Of course, it is not necessary to seal the buoy interior. Alternately, the cask may be filled with water of suitable quality before launching the buoy from the docking position toward the loading position.

Figure 10:
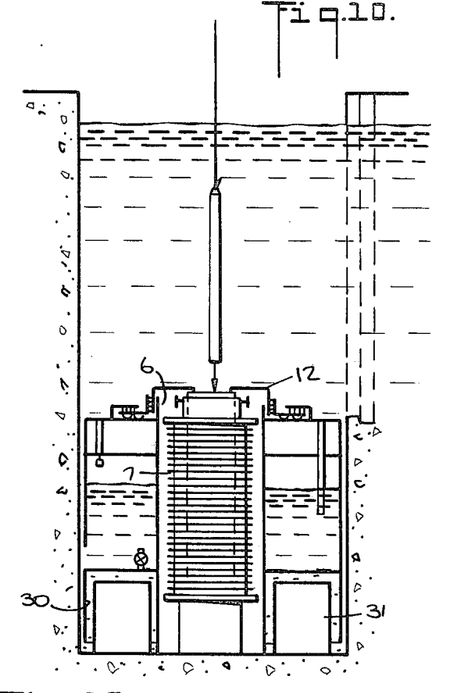
Figure 11:
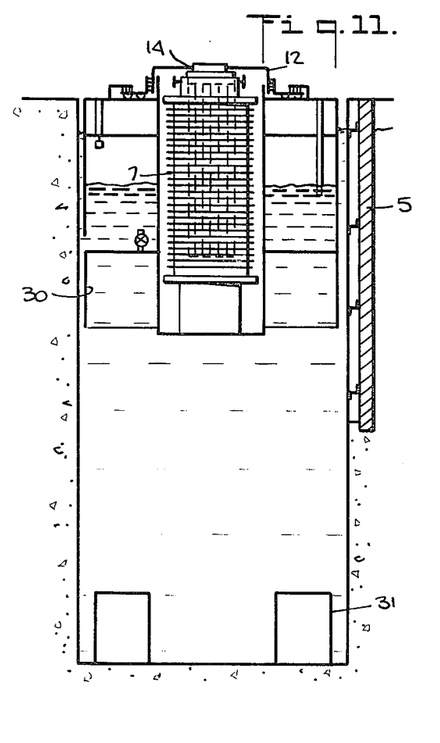

Gate 5 is now opened and spent fuel elements are carried to the buoy in an upright position through the canal 4 from the spent fuel pool 3. The spent fuel elements are lowered into the cask as shown in FIG. 10. After fuel elements have been loaded into the cask, the regular cask cover (not shown) is bolted on. This operation can be performed with long tools reaching down from the operating floor at the docking position. The gate 5 is then closed and thereafter the buoy 1 is caused to rise in the shaft by delivering air under pressure through the air vent/supply hose 17 to displace water from the annular chamber 16 of the buoy.

Bottom load sensors 35 (FIG. 2) enable the operator to perceive the approach of the buoy to neutral buoyancy as the compressed air expels water from the chamber 16. When the bottom load sensors 35 indicate a zero load, an additional quantity of water is displaced from the buoy to establish a slight degree of positive buoyancy. The buoy is then elevated toward the docking position.

Ascent protection means in the form of an overflow tube 36 limits the quantity of water which can be displaced from the buoy because once the water level passes below the open bottom end of the tube 36, the air being used to displace the water will escape by means of this tube 36. This arrangement assures that the quantity of water, which can be displaced, and the degree of positive buoyancy, which can be induced, is limited. Accordingly, it is impossible to produce a degree of positive buoyancy which could result in an excessive rate of vertical motion in the upward direction which could cause an excessive impact upon the hydraulic snubbers 20 at the docking position.

The maximum degree of positive buoyancy can be set for the buoy by adjusting the elevation of the open bottom end of tube 36 in the chamber 16. This is achieved by setting the elevation of the threaded calibration rod 50 which supports the lower end of the tube 36.

Figure 12:
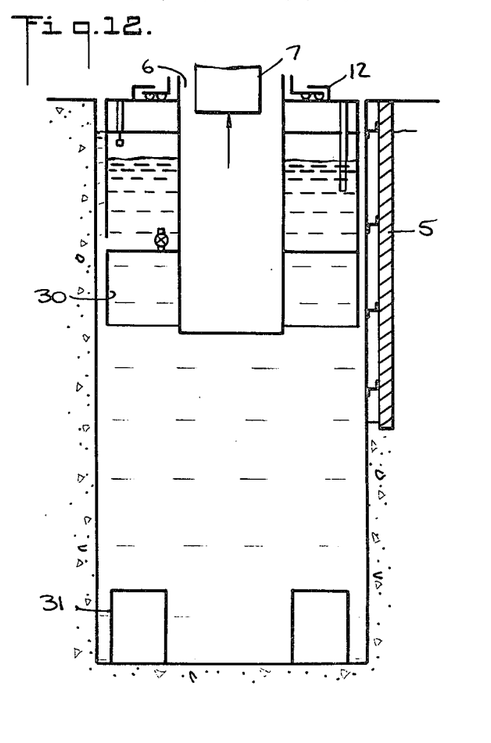

FIG. 11 shows the buoy again at its docking position whereat the seal cover 12 is removed and the loaded cask withdrawn from the buoy by the crane 9 (FIG. 12).

The buoy motion described in connection with FIGS. 5 to 12 is controlled by a passive system. There is no reliance on feedback signals in terms of buoy position, velocity, or acceleration to regulate air supply or venting.

Figure 13:
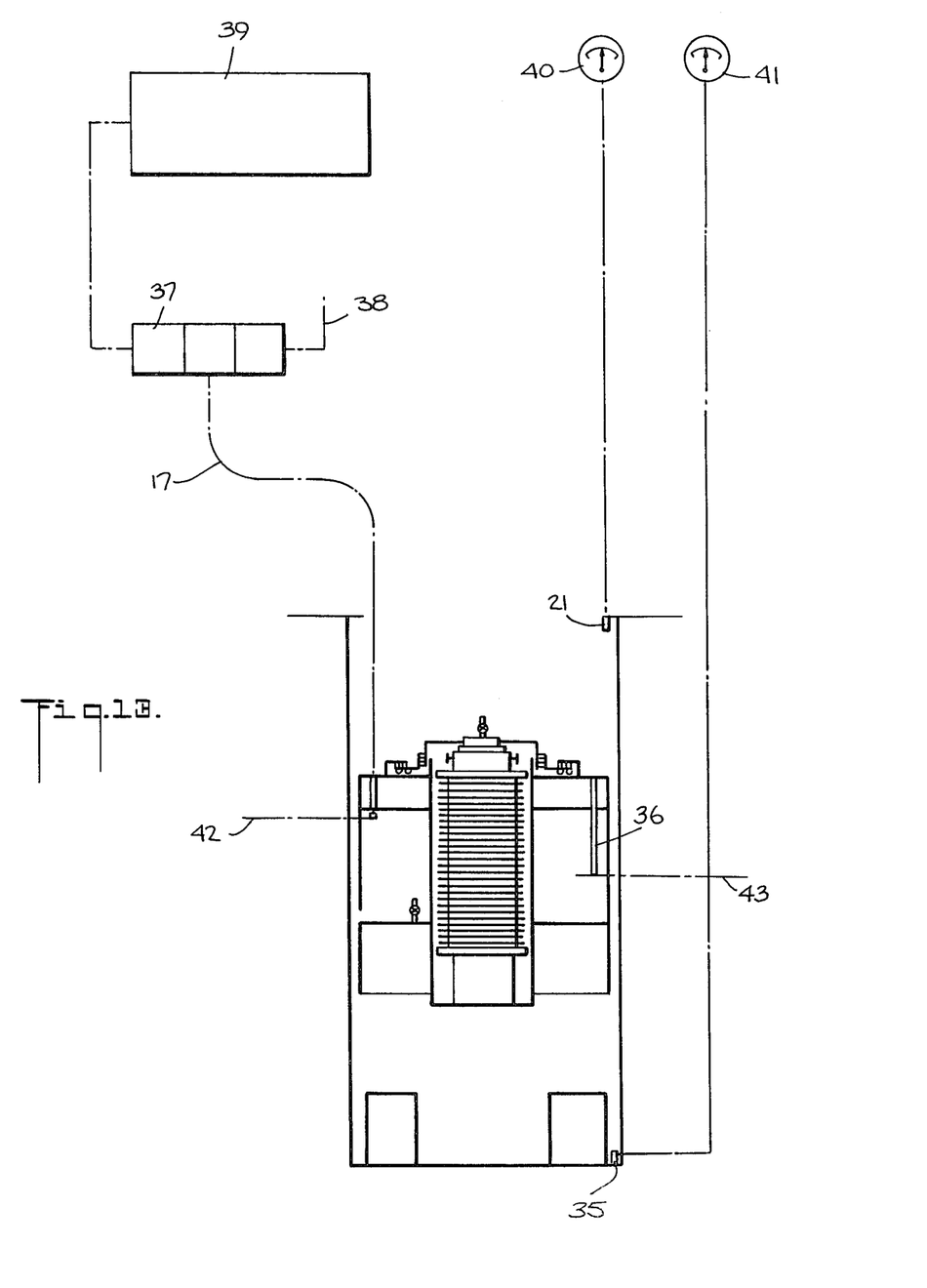
FIG. 13 is a schematic diagram of the bouyancy control means for effecting passive control of buoy motion.

FIG. 13 illustrates schematically the buoyancy control means for effecting the passive control of buoy motion. The buoyancy control means includes the chamber 16 formed in the buoy and gas control means which coacts with the chamber by supplying gas under pressure to the chamber for expelling liquid therefrom when it is required to increase buoyancy and for venting the gas in the chamber when it is required to reduce the buoyant forces acting on the buoy.

The gas control means can include valve means in the form of a three-way valve 37 which connects the vent 38 to the chamber 16 through the flexible hose 17 when air is to be vented from the chamber and connects the pressure supply means 39 to the chamber 16 when air under pressure is to be supplied thereto. An upper load indicator 40 is connected to upper elevation sensor 21 for providing an indication of the upward buoyant force acting on the buoy at the docking position. A bottom load indicator 41 is connected to lower elevation sensor 35 for indicating the negative buoyancy of the buoy at the loading position.

When the buoy is at the docking position and loaded with the empty cask, an operator will open the three-way valve 37 to vent air from the chamber 16 until the upper load indicator 40 shows that the buoy is at neutral buoyancy. The operator then vents an additional amount of gas with the three-way valve 37 just sufficient to cause the buoy to acquire a negative buoyancy whereby the buoy sinks from the upper elevation docking position to the lower elevation loading position. For moving the buoy from the loading position to the docking position, the operator adjusts the three-way valve to connect the pressure supply means 39 with the chamber 16 so that gas under pressure from the pressure supply means is fed into the chamber 16 until an amount of water is displaced therefrom which causes the bottom load indicator to indicate neutral buoyancy. Thereafter, the three-way valve 37 is kept open to the pressure supply means 39 to supply an additional amount of gas just sufficient to cause the buoy to acquire a positive buoyancy whereby the buoy rises in the shaft to return to the upper elevation.

The upper datum line 42 in FIG. 13 marks the position of the nozzle opening 24 of the air vent/supply hose 17 and so marks the upper limit of the water level in the chamber. The lower datum line 43 marks the lower limit to which the water level can be reduced for providing the upward buoyant force.

Figure 14:
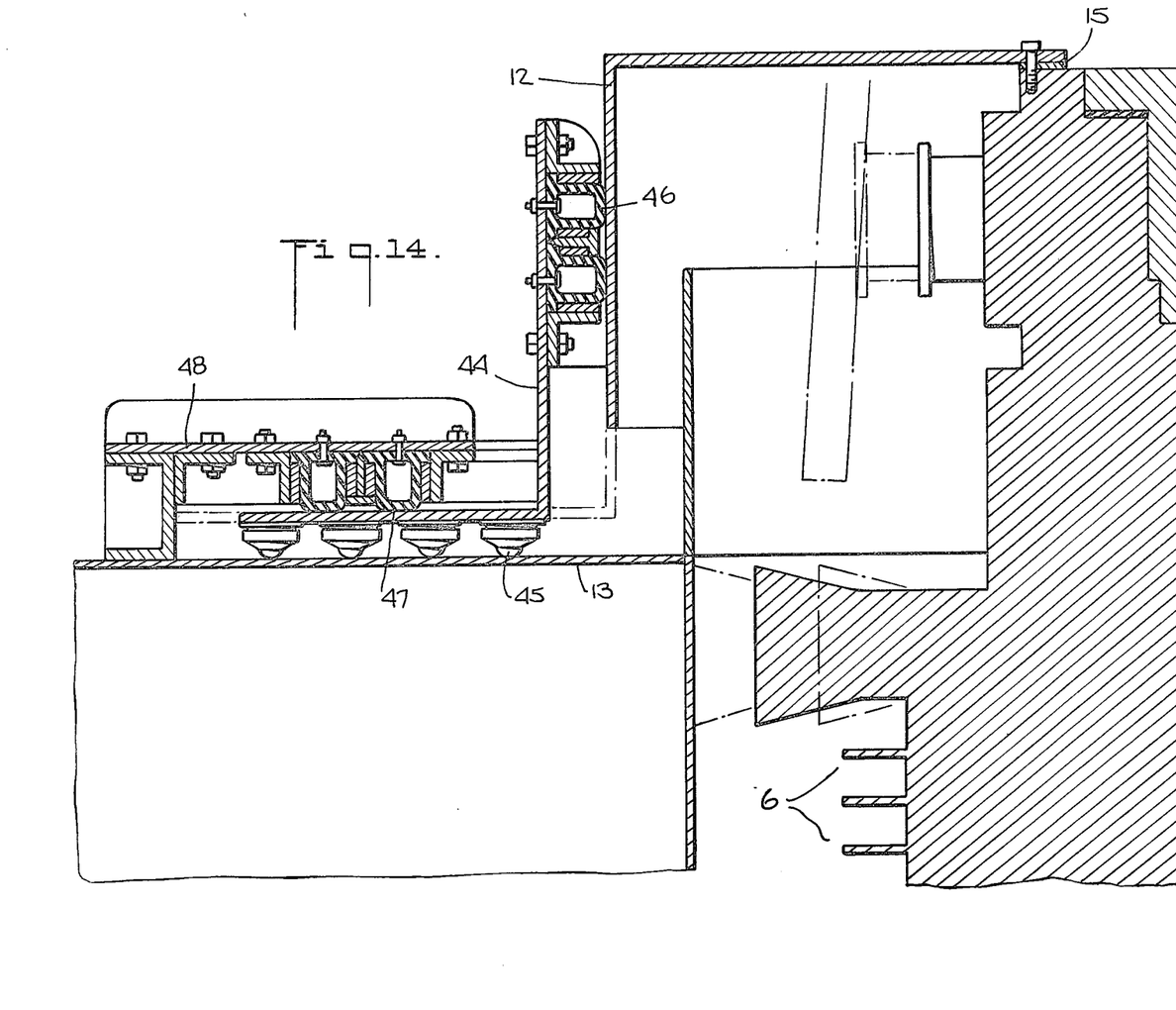
FIG. 14 is a fragmentary view, in section, of a pertinent portion of the buoy to illustrate the seal arrangement for establishing a water-tight seal between the buoy and the cask carried therein.

FIG. 14 shows details of the sealing arrangement to keep the water of the pit from entering the cavity 6 of the buoy 1. The sealing arrangement includes a flange 44 which is L-shaped in cross-section and is supported by rollers 45 with respect to the roof 13 of the buoy. The flange 44 carries inflatable annular rubber seals 46 which engage the flanged seal cap 12 when inflated. Since the flange 44 is supported by rollers 45, it can shift laterally if the cask 7 is off center within the cavity 6 of the buoy. Inflatable seals 47 are mounted upon an annular support 48 and provide a water-tight seal with respect to the L-shaped cross-section flange 44 as shown. The annular support 48 is, in turn, fixedly mounted on the roof 13 of the buoy.

Figures 15, 16:
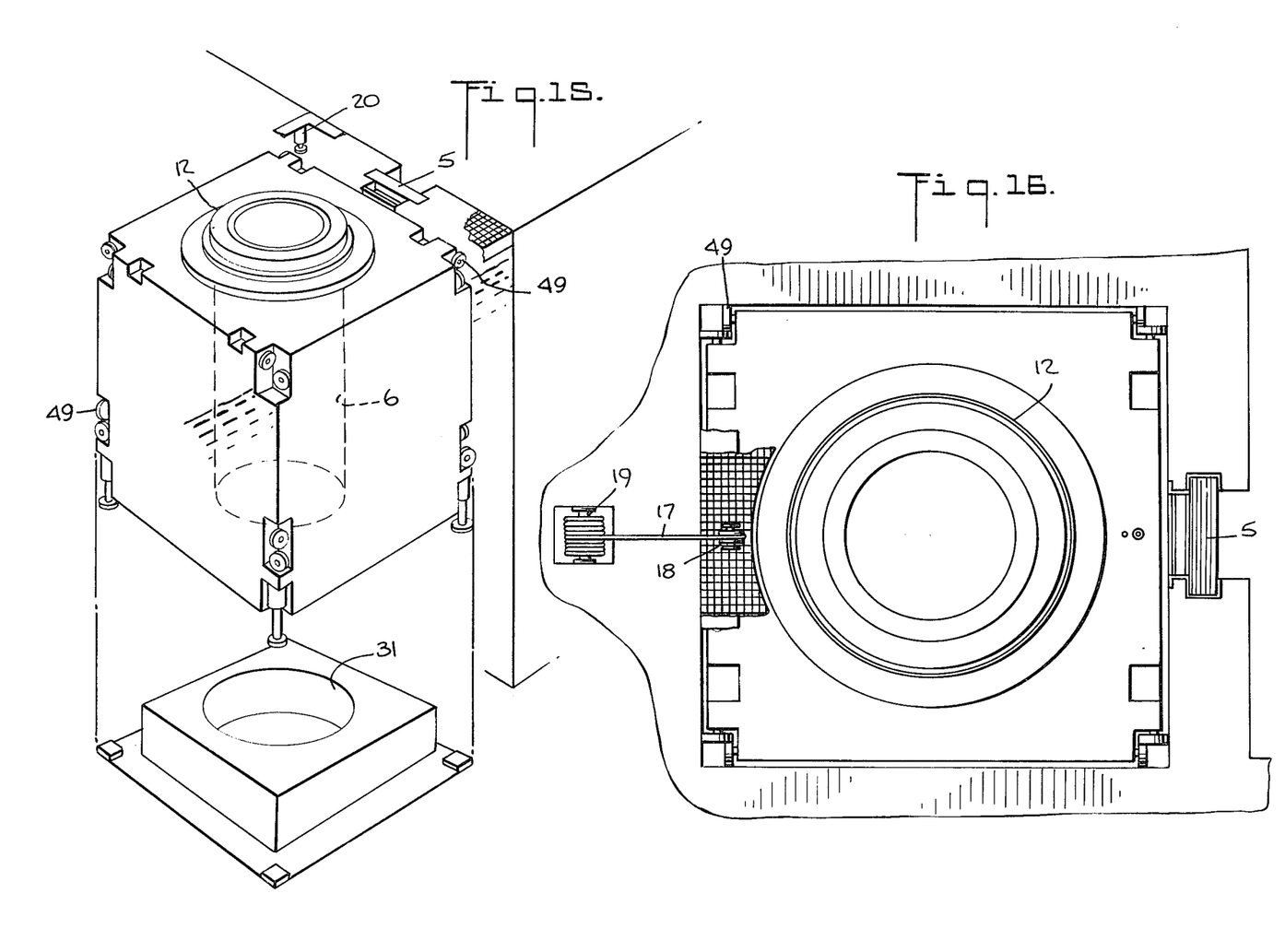
FIG. 15 is an isometric view showing a preferred configuration of the buoy equipped with rollers to prevent the buoy from becoming jammed against the pit walls.
FIG. 16 is a plan view of the elevator of the invention.

The buoy 1 can have any particular shape. However, a square or rectangular section for the buoy is preferred as shown in FIG. 15. The buoy is guided during its travel by spring loaded wheels 49 recessed in all four corners of each vertical face of the buoy. Jamming of the buoy in the cask loading pit between the upper and lower elevations is therefore not anticipated. Also, configuring the buoy so that the center of gravity of the cask is below the center of buoyancy volume will also aid in guiding the buoy during its travel.

What is claimed is:

1. A cask handling system for transporting a nuclear fuel shipping cask between upper and lower elevations in a nuclear facility comprising shaft means for containing liquid therein extending between said elevations; a buoy disposed in the shaft having a cavity formed therein for receiving and for transporting the cask between said elevation in said shaft, removable sealing means for sealing said cavity when the cask is in place in said buoy to prevent penetration of the liquid of said shaft into said cavity during the travel of said buoy between said elevations, said removable sealing means comprising a removable annular seal cap which is fastenable seal-tight to the cask; structual means mounted on said buoy and disposed in surrounding relation to said annular seal cap; and annular seal means for sealing said structure means with respect to said seal cap; and, buoyancy control means for controlling the buoyancy of said buoy to cause it to ascend and descend in the shaft means.

2. The cask handling system of claim 1 wherein said buoy has a longitudinal axis extending parallel to the longitudinal axis of said shaft, said seal cap being an annular member having an L-shaped section, one of the legs of the L-shaped section of said seal cap being fastenable seal-tight to the cask; said structure means comprising: an annular support fixedly mounted on said buoy and conjointly defining an annular cavity with the top surface of said buoy, said cavity having an annular opening directed toward said longitudinal axis; an annular intermediate member having an L-shaped section, one of the legs of the L-shaped section of said annular intermediate member being adjacent the other leg member of said seal cap and the other one of said legs of said intermediate member extending into said last-mentioned annular cavity; and, roller means attached to said other leg of said intermediate member for facilitating the lateral movement of said intermediate member whereby the position of said intermediate member is adjustable with respect to said seal cap mounted on the cask; and, said annular seal means comprising: a first annular inflatable seal disposed between the mutually adjacent legs of said seal cap and said intermediate member; and, a second inflatable seal means disposed between said other leg of said intermediate member and said annular support.

3. The cask handling system of claim 1, said shaft having four vertical walls defining a shaft passage having a right-angle quadrilateral section, said buoy having four vertical outer wall portions one connected to the other corresponding to respective ones of the walls of said shaft, and roller means mounted in said vertical outer walls of said buoy for engaging the walls of said shaft to prevent the outer walls of said buoy from contacting the vertical walls of said shaft during the movement of the buoy between said elevations.

4. The cask handling system of claim 1 wherein the shaft means is tubular in form and has a predetermined transverse cross-section and wherein the buoy extends along a portion of the length of the shaft means and has a transverse cross-section substantially corresponding to that of the shaft means with a predetermined clearance with respect thereto, movement of the buoy within the shaft means causing a passage of liquid through the predetermined clearance, the passage of liquid from the portion of the shaft means toward which the buoy ascends or descends and through the predetermined clearance between the buoy and the shaft means causing forces which are in a direction opposite to the ascent or descent of the buoy, whereby the buoy is restrained from excessive velocities during ascent or descent.

5. The cask handling system of claim 4 in which the transverse cross-section of both the shaft means and the buoy having a predetermined clearance with the shaft means are substantially rectangular.

6. A cask handling system for transporting a nuclear fuel shipping cask between upper and lower elevations in a nuclear facility comprising a vertical shaft for containing liquid therein extending between the upper and lower elevations, the cask being submerged in the liquid when at the lower elevation, the extent of the shaft between said elevations having a substantially constant horizontal cross-section, a submersible buoy disposed in the shaft and having an upwardly facing surface for supporting the cask and transporting the cask between said elevations in said shaft; buoyancy control means for controlling the buoyancy of said buoy to cause said buoy to ascend and descend in said shaft comprising a chamber formed in said buoy and communicating with the liquid in said shaft; and, gas control means for supplying gas under pressure to said chamber for expelling liquid therefrom whereby the buoyant forces acting on said buoy are increased and for venting said gas from said chamber for causing liquid to enter said chamber whereby the buoyant forces acting on said buoy are reduced, said gas control means comprising upper elevation sensor means for sensing the upward buoyant force acting on said buoy at said upper elevation when said buoy is in a condition of positive buoyancy, and an indicator connected to said upper elevation sensor means for indicating when the gas vented from said chamber places said buoy in a condition of negative buoyancy, said buoy having a horizontal cross-section closely fitted to the horizontal cross-section of the shaft with a narrow clearance between the side of the buoy and the side of the shaft, the narrow clearance enabling liquid therein and the movement of liquid therein to impede movement of said buoy within said shaft.

7. The cask handling system of claim 6 and further comprising additional means for preventing excessive descent rates including descent protection means for limiting the amount of gas vented from said chamber thereby limiting the maximum degree of negative buoyancy of said buoy.

8. The cask handling system of claim 7 in which said descent protection means for limiting the amount of gas vented from said chamber thereby limiting the maximum degree of negative buoyancy of said buoy includes a tube member extending downwardly into the chamber formed in said buoy for venting said gas from said chamber through the interior of the tube member, the lower end portion of the tube member being disposed at a predetermined vertical position within the chamber which substantially defines a predetermined maximum level to which liquid can rise in the chamber when the liquid reaches the lower end portion of the tube member, the portion of the chamber disposed above the lower end portion of the tube member providing a predetermined portion of the chamber into which liquid cannot enter and which thereby maintains a predetermined minimum force component of positive buoyancy.

9. The cask handling system of claim 7 wherein a flexible hose extends into said chamber and has a nozzle through which the gas can be supplied to or vented from said chamber, said descent protection means comprising: said nozzle located at a predetermined elevation in said chamber to prevent a further escape of gas from said chamber when the liquid in said chamber reaches said last-mentioned elevation whereby the gas trapped in said chamber limits the maximum degree of negative buoyancy which can occur thereby limiting the rate of descent of said buoy in said shaft.

10. The cask handling system of claim 9, said descent protection means comprising: means for adjusting said elevation of said nozzle to adjust said maximum degree of negative buoyancy.

11. The cask handling system of claim 6 in which said gas control means comprises: pressure supply means for supplying gas under pressure; vent means for venting gas from said chamber; a flexible hose communicating with said chamber; and, valve means for selectively connecting said pressure supply means and said vent to said flexible hose.

12. The cask handling system of claim 6 in which said gas control means includes ascent protection means for selectively limiting the amount of gas supplied to said chamber thereby limiting the maximum degree of positive buoyancy of said buoy.

13. The cask handling system of claim 12 in which said ascent protection means comprises: a tube member extending vertically into and communicating with said chamber for taking up the gas supplied to said chamber after an amount of liquid has been expelled whereby the liquid remaining in said chamber limits the maximum degree of positive buoyancy which can occur thereby limiting the rate of ascent of said buoy in said shaft.

14. The cask handling system of claim 13 in which said ascent protection means comprises: means for adjusting the elevation of the opening of said tube member in said chamber to adjust said maximum degree of negative buoyancy.

15. The cask handling system of claim 6 in which said chamber is partitioned into two sub-chambers, one of said subchambers being gas-tight and devoid of any of said liquid, said gas control means being arranged to communicate with the other one of said sub-chambers to adjust the level of liquid therein to adjust the buoyancy of said buoy.

16. The cask handling system of claim 6 in which said chamber is partitioned into two sub-chambers, said gas control means being configured for selectively supplying gas under pressure to or venting gas from each of said sub-chambers.

17. The cask handling system of claim 6 in which said buoy has an elongated cavity extending vertically from adjacent the top portion to adjacent the bottom portion of the buoy, the length of the cavity substantilly corresponding to the vertical length of the cask, the upper portion of the cavity being open for receiving the cask within the cavity, the bottom portion of the cavity being adapted to support the bottom portion of the cask; and removable sealing means for sealing said cavity when the cask is in place in said buoy to prevent penetration of the liquid of said shaft into said cavity during the travel of said buoy between said elevations.

18. A cask handling system for transporting a nuclear fuel shipping cask between upper and lower elevations in a nuclear facility comprising a vertical shaft for containing liquid therein extending between the upper and lower elevations, the cask being submerged in the liquid when at the lower elevation, the extent of the shaft between said elevations having a substantially constant horizontal cross-section, a submersible buoy disposed in the shaft and having an upwardly facing surface for supporting the cask and transporting the cask between said elevations in said shaft, said buoy having an elongated cavity extending vertically from adjacent the top portion to adjacent the bottom portion of the buoy, the length of the cavity substantially corresponding to the vertical length of the cask, the upper portion of the cavity being open for receiving the cask within the cavity, the bottom portion of the cavity being adopted to support the bottom portion of the cask; removable sealing means for sealing said cavity when the cask is in place in said buoy to prevent penetration of the liquid of said shaft into said cavity during the travel of said buoy between said elevations; buoyancy control means for controlling the buoyancy of said buoy to cause said buoy to ascend and descend in said shaft, said buoy having a horizontal cross-section closely fitted to the horizontal cross-section of the shaft with a narrow clearance between the side of the buoy and the side of the shaft, the narrow clearance enabling liquid therein and the movement of liquid therein to impede movement of said buoy within said shaft.

19. The cask handling system of claim 18 and further comprising means for restraining said buoy from the force of positive buoyancy prior to loading a cask in said buoy at said upper elevation.

20. A cask handling system for transporting a nuclear fuel shipping cask between upper and lower elevations in a nuclear facility comprising a vertical shaft for containing liquid therein extending between the upper and lower elevations, the cask being submerged in the liquid when at the lower elevation, the extent of the shaft between said elevations having a substantially constant horizontal cross-section, a submersible buoy disposed in the shaft and having an upwardly facing surface for supporting the cask and transporting the cask between said elevations in said shaft; buoyancy control means for controlling the buoyancy of said buoy to cause said buoy to ascend and descend in said shaft comprising a chamber formed in said buoy and communicating with the liquid in said shaft; and, gas control means for supplying gas under pressure to said chamber for expelling liquid therefrom whereby the buoyant forces acting on said buoy are increased and for venting said gas from said chamber for causing liquid to enter said chamber whereby the buoyant forces acting on said buoy are reduced, said gas control means comprising lower elevation sensor means for sensing the downward load of said buoy at said lower elevation when said buoy is in a condition of negative buoyancy, and an indicator connected to said lower elevation sensor means for indicating when the gas under pressure supplied to said chamber from said pressure supply means places said buoy in a condition of positive buoyancy, said buoy having a horizontal cross-section closely fitted to the horizontal cross-section of the shaft with a narrow clearance between the side of the buoy and the side of the shaft, the narrow clearance enabling liquid therein and the movement of liquid therein to impede movement of said buoy within said shaft.

21. The cask handling system of claim 20 and further comprising additional means for preventing excessive descent rates including descent protection means for limiting the amount of gas vented from said chamber thereby limiting the maximum degree of negative buoyancy of said buoy.

22. The cask handling system of claim 21 in which said descent protection means for limiting the amount of gas vented from said chamber thereby limiting the maximum degree of negative buoyancy of said buoy includes a tube member extending downwardly into the chamber formed in said buoy for venting said gas from said chamber through the interior of the tube member, the lower end portion of the tube member being disposed at a predetermined vertical position within the chamber which substantially defines a predetermined maximum level to which liquid can rise in the chamber when the liquid reaches the lower end portion of the tube member, the portion of the chamber disposed above the lower end portion of the tube member providing a predetermined portion of the chamber into which liquid cannot enter and which thereby maintains a predetermined minimum force component of positive buoyancy.

23. The cask handling system of claim 21 wherein a flexible hose extends into said chamber and has a nozzle through which the gas can be supplied to or vented from said chamber, said descent protection means comprising: said nozzle located at a predetermined elevation in said chamber to prevent a further escape of gas from said chamber when the liquid in said chamber reaches said last-mentioned elevation whereby the gas trapped in said chamber limits the maximum degree of negative buoyancy which can occur thereby limiting the rate of descent of said buoy in said shaft.

24. The cask handling system of claim 23, said descent protection means comprising: means for adjusting said elevation of said nozzle to adjust said maximum degree of negative buoyancy.

25. The cask handling system of claim 20 in which said gas control means comprises: pressure supply means for supplying gas under pressure; vent means for venting gas from said chamber; a flexible hose communicating with said chamber; and, valve means for selectively connecting said pressure supply means and said vent to said flexible hose.

26. The cask handling system of claim 20 in which said gas control means includes ascent protection means for selectively limiting the amount of gas supplied to said chamber thereby limiting the maximum degree of positive buoyancy of said buoy.

27. The cask handling system of claim 26 in which said ascent protection means comprises: a tube member extending vertically into and communicating with said chamber for taking up the gas supplied to said chamber after an amount of liquid has been expelled whereby the liquid remaining in said chamber limits the maximum degree of positive buoyancy which can occur thereby limiting the rate of ascent of said buoy in said shaft.

28. The cask handling system of claim 27 in which said ascent protection means comprises: means for adjusting the elevation of the opening of said tube member in said chamber to adjust said maximum degree of negative buoyancy.

29. The cask handling system of claim 20 in which said chamber is partitioned into two sub-chambers, one of said sub-chambers, being gas-tight and devoid of any of said liquid, said gas control means being arranged to communicate with the other one of said sub-chambers to adjust the level of liquid therein to adjust the buoyancy of said buoy.

30. The cask handling system of claim 20 in which said chamber is partitioned into two sub-chambers, said gas control means being configured for selectively supplying gas under pressure to or venting gas from each of said sub-chambers.

31. A cask handling system for transporting a nuclear fuel shipping cask between upper and lower elevations in a nuclear facility comprising a vertical shaft for containing liquid therein extending between the upper and lower elevations, the cask being submerged in the liquid when at the lower elevation, the extent of the shaft between said elevations having a substantially constant horizontal cross-section, a submersible buoy disposed in the shaft and having an upwardly facing surface for supporting the cask and transporting the cask between said elevations in said shaft; buoyancy control means for controlling the buoyancy of said buoy to cause said buoy to ascend and descend in said shaft, said buoy having a horizontal cross-section closely fitted to the horizontal cross-section of the shaft with a narrow clearance between the side of the buoy and the side of the shaft, the narrow clearance enabling liquid therein and the movement of liquid therein to impede movement of said buoy within said shaft, said cask handling system further comprising dash-pot means disposed at the lower elevation of said shaft for co-acting with said buoy to decelerate the same as said buoy reaches said lower elevation, said dash-pot means comprising an annular cavity formed in the base of said buoy, said cavity being of a U-shape when viewed from a vertical cross-section of it and, an annular structure protruding from the base of said shaft and dimensioned so as to fill said cavity as said buoy reaches said lower elevation whereby the liquid in said cavity is forced therefrom thereby decelerating said buoy as the same reaches said lower elevation.

32. A method for lowering and raising a cask for transporting nuclear fuel elements between upper and lower elevations in a nuclear facility by means of a buoy which is supported by buoyancy in a shaft containing liquid, the buoy, having a hollow interior portion adapted to serve as a buoyancy chamber the method comprising the step of:
  a. establishing a magnitude of positive buoyancy for the buoy substantially corresponding to the weight of the cask which is to be transported;
  b. placing the cask upon the buoy when the buoy is adjacent the upper elevation with the positive buoyancy of the buoy maintaining it substantially stationary;
  c. reducing the magnitude of positive buoyancy to cause the buoy with the cask to descend with respect to the shaft from the upper elevation;
  d. restricting the clearance between the buoy and the shaft in which the buoy is supported by buoyancy to an extent that the movement of liquid with respect to the exterior of the buoy and through the clearance between the buoy and the shaft provides forces in a direction opposite to the travel of the buoy during ascent and descent within the shaft, whereby the restraining forces oppose the onset of excessive rates of travel of the buoy;
  e. terminating the descent of the buoy at the lower elevation to enable fuel elements to be moved with respect to the cask including providing an open chamber adjacent the bottom portion of the shaft with the opening of the chamber facing the bottom portion of the buoy and adapted to receive the bottom portion of the buoy within the opening and advancing the bottom portion of the buoy into the opening of the chamber during the final portion of the descent of the buoy within the shaft, the advancing of the bottom portion of the buoy into the opening of the chamber evacuating liquid from the chamber and producing forces in opposition to the descent of the buoy, whereby the buoy is decelerated during the final portion of the descent in the shaft; and f. re-establishing a magnitude of positive buoyancy to cause the buoy with the cask to ascend with respect to the shaft to the upper elevation.

33. A method for lowering and raising a cask in accordance with claim 32 in which the step of establishing and reestablishing a magnitude of positive buoyancy within the buoy comprises admitting gas to the buoyancy chamber of the buoy for displacing liquid therefrom to increase the magnitude of positive buoyancy of the buoy and in which the step of reducing the magnitude of positive buoyancy comprises releasing gas from the buoyancy chamber of the buoy and thereby enabling the entrance of liquid into the buoyancy chamber for reducing the magnitude of the positive buoyancy of the buoy.

34. A method for lowering and raising a cask in accordance with claim 32 and further comprising the step of limiting the magnitude of positive buoyancy being established and reestablished for the buoy from extending substantially beyond the value thereof necessary to support the weight of the cask in order to limit the rate of ascent of the buoy.

35. A method for lowering and raising a cask in accordance with claim 34 in which the step of limiting the magnitude of positive buoyancy of the buoy comprises limiting the amount of liquid which can be displaced from the buoyancy chamber of the buoy, whereby the maximum magnitude of positive buoyancy is limited.

36. A method for lowering and raising a cask in accordance with claim 32 and further comprising the step of limiting the reducing of the magnitude of positive buoyancy during the descent of the buoy in order to restrict the maximum rate of descent to a substantially predetermined value.

37. A method for lowering and raising a cask in accordance with claim 36 in which the step of limiting the reducing of the magnitude of positive buoyancy during descent of the buoy comprises limiting the release of gas from the buoyancy chamber of the buoy and thereby the entrance of liquid into the buoy in order to restrict the maximum reduction of the positive buoyancy of the buoy to a substantially predetermined value.

38. A method for lowering and raising a cask in accordance with claim 32 and further comprising the step of restricting the clearance between the buoy and the shaft in which the buoy is supported by buoyancy to an extent that the movement of liquid with respect to the exterior of the buoy and through the clearance between the buoy and the shaft provides forces in a direction opposite to the travel of the buoy during ascent and descent within the shaft, whereby the restraining forces oppose the onset of excessive rates of travel of the buoy.

39. A system for lowering and raising a massive load between upper and lower elevations in a facility comprising shaft means for containing liquid therein extending between said elevations; a submersible buoy disposed in the shaft having an upwardly facing surface for accommodating the load thereon and for transporting the same between said elevations in said shaft; the load being submerged beneath the liquid at the lower elevation; the shaft means being tubular in form and having a predetermined transverse cross-section and wherein the buoy extends along a portion of the length of the shaft means and has a transverse cross-section substantially corresponding to that of the shaft means with a predetermined clearance with respect thereto, movement of the buoy within the shaft means causing a passage of liquid through the predetermined clearance, the passage of liquid from the portion of the shaft means toward which the buoy ascends or descends and through the predetermined clearance between the buoy and the shaft means causing forces which are in a direction opposite to the ascent or descent of the buoy, whereby the buoy is restrained from excessive velocities during ascent or descent; and, buoyancy control means for controlling the buoyancy of said buoy to cause the same to ascend and descend in said shaft means including a chamber formed in said buoy and communicating with the liquid in said shaft and, gas control means for supplying gas under pressure to said chamber for expelling liquid therefrom whereby the buoyant forces acting on said buoy are increased and for venting said gas from said chamber for causing liquid to enter said chamber whereby the buoyancy forces acting on said buoy are reduced, said gas control means comprising upper elevation sensor means for sensing the upward buoyant force acting on said buoy at said upper elevation when said buoy is in a condition of positive buoyancy, and an indicator connected to said upper elevation sensor means for indicating when the gas vented from said chamber places said buoy in a condition of negative buoyancy.

40. The system of claim 39 in which said gas control means further includes descent protection means for limiting the amount of gas vented from said chamber, thereby limiting the maximum degree of negative buoyancy of said buoy.

41. The system of claim 40 in which said descent protection means for limiting the amount of gas vented from said chamber thereby limiting the maximum degree of negative buoyancy of said buoy includes a tube member extending downwardly into the chamber formed in said buoy for venting said gas from said chamber through the interior of the tube member, the lower end portion of the tube member being disposed at a predetermined vertical position within the chamber which substantially defines a predetermined maximum level to which liquid can rise in the chamber when the liquid reaches the lower end portion of the tube member, the portion of the chamber disposed above the lower end portion of the tube member providing a predetermined portion of the chamber into which liquid cannot enter and which thereby maintains a predetermined minimum force component of positive buoyancy.

42. The system of claim 39 in which said chamber is partitioned into two sub-chambers, said gas control means being configured for selectively supplying gas under pressure to or venting gas from each of said sub-chambers.

43. The system of claim 39 comprising: dash-pot means disposed at the lower elevation of said shaft for co-acting with said buoy to decelerate the same as said buoy reaches said lower elevation.

44. A system for lowering and raising a massive load between upper and lower elevations in a facility comprising shaft means for containing liquid therein extending between said elevations; a submersible buoy disposed in the shaft having an upwardly facing surface for accommodating the load thereon and for transporting the same between said elevations in said shaft; the load being submerged beneath the liquid at the lower elevation; the shaft means being tubular in form and having a predetermined transverse cross-section and wherein the buoy extends along a portion of the length of the shaft means and has a transverse cross-section substantially corresponding to that of the shaft means with a predetermined clearance with respect thereto, movement of the buoy within the shaft means causing a passage of liquid through the predetermined clearance, the passage of liquid from the portion of the shaft means toward which the buoy ascends or descends and through the predetermined clearance between the buoy and the shaft means causing forces which are in a direction opposite to the ascent or descent of the buoy, whereby the buoy is restrained from excessive velocities during ascent or descent; and, buoyancy control means for controlling the buoyancy of said buoy to cause the same to ascend and descend in said shaft means including a chamber formed in said buoy and communicating with the liquid in said shaft and, gas control means for supplying gas under pressure to said chamber for expelling liquid therefrom whereby the buoyant forces acting on said buoy are increased and for venting said gas from said chamber for causing liquid to enter said chamber whereby the buoyancy forces acting on said buoy are reduced, said gas control means comprising lower elevation sensor means for sensing the downward load of said buoy at said lower elevation when said buoy is in a condition of negative buoyancy, and an indicator connected to said lower elevation sensor means for indicating when the gas under pressure supplied to said chamber from said pressure supply means places said buoy in a condition of positive buoyancy.

45. The system of claim 44 in which said gas control means further includes descent protection means for limiting the amount of gas vented from said chamber, thereby limiting the maximum degree of negative buoyancy of said buoy.

46. The system of claim 44 in which said chamber is partitioned into two sub-chambers, said gas control means being configured for selectively supplying gas under pressure to or venting gas from each of said sub-chambers.

47. The system of claim 44 comprising: dash-pot means disposed at the lower elevation of said shaft for co-acting with said buoy to decelerate the same as said buoy reaches said lower elevation.

48. A system for lowering and raising a massive load between upper and lower elevations in a facility comprising shaft means for containing liquid therein extending between said elevations; a submersible buoy disposed in the shaft having an upwardly facing surface for accommodating the load thereon and for transporting the same between said elevations in said shaft; the load being submerged beneath the liquid at the lower elevation; the shaft means being tubular in form and having a predetermined transverse cross-section and wherein the buoy extends along a portion of the length of the shaft means and has a transverse cross-section substantially corresponding to that of the shaft means with a predetermined clearance with respect thereto, movement of the buoy within the shaft means causing a passage of liquid through the predetermined clearance, the passage of liquid from the portion of the shaft means toward which the buoy ascends or descends and through the predetermined clearance between the buoy and the shaft means causing forces which are in a direction opposite to the ascent or descent of the buoy, whereby the buoy is restrained from excessive velocities during ascent or descent; and, buoyancy control means for controlling the buoyancy of said buoy to cause the same to ascend and descend in said shaft means including a chamber formed in said buoy and communicating with the liquid in said shaft and, gas control means for supplying gas under pressure to said chamber for expelling liquid therefrom whereby the buoyant forces acting on said buoy are increased and for venting said gas from said chamber for causing liquid to enter said chamber whereby the buoyancy forces acting on said buoy are reduced, said gas control means including ascent protection means for limiting the amount of gas supplied to said chamber thereby limiting the maximum degree of positive buoyancy of said buoy comprising a tube extending vertically into and communicating with said chamber for taking up the gas supplied to said chamber after an amount of liquid has been expelled whereby the liquid remaining in said chamber limits the maximum degree of positive buoyancy which can occur thereby limiting the rate of ascent of said buoy in said shaft.

49. A method for lowering and raising a massive load between upper and lower elevations in a facility by means of a submersible buoy which is supported by buoyancy in a shaft containing liquid, the buoy having an upwardly facing surface for accommodating the load therefore and transporting the same between said elevations, a hollow interior portion adapted to serve as a buoyancy chamber, the method comprising the steps of:
 a. establishing a magnitude of positive buoyancy for the buoy substantially corresponding to the weight of the load which is to be transported;
 b. placing the load upon the buoy when the buoy is adjacent the upper elevation with the positive buoyancy of the buoy maintaining it substantially stationary;
 c. reducing the magnitude of positive buoyancy to cause the buoy with the load to descend with respect to the shaft from the upper elevation;
 d. restricting the clearance between the buoy and the shaft in which buoy is supported by buoyancy to an extent that the movement of liquid with respect to the exterior of the buoy and through the clearance between the buoy and the shaft provides forces in a direction opposite to the travel of the buoy during ascent and descent within the shaft, whereby the restraining forces oppose the onset of excessive rates of travel of the buoy,
 e. terminating the descent of the buoy at the lower elevation and providing an open chamber adjacent the bottom portion of the shaft with the opening of the chamber facing the bottom portion of the buoy and adapted to receive the bottom portion of the buoy within the opening and advancing the bottom portion of the buoy into the opening of the chamber during the final portion of the descent of the buoy within the shaft, the advancing of the bottom portion of the buoy into the opening of the chamber evacuating liquid from the chamber and producing forces in opposition to the descent of the buoy, whereby the buoy is decelerated during the final portion of the descent in the shaft; and
 f. re-establishing a magnitude of positive buoyancy to cause at least one of the buoy and the buoy with the load to ascend with respect to the shaft to the upper elevation.

* * * * *

UNITED STATES PATENT AND TRADEMARK OFFICE
CERTIFICATE OF CORRECTION

PATENT NO. : 4,069,923
DATED : January 24, 1978
INVENTOR(S) : Leif Blumenau and Frank John Pignata, Jr.

It is certified that error appears in the above-identified patent and that said Letters Patent are hereby corrected as shown below:

Col. 3, line 4: change "spend" to -- spent --.
Col. 4, line 11: change "vent supply" to -- vent/supply --.

Col. 6, line 41: change "is" to -- in --.
Col. 9, line 15: change "shaft," to -- shaft; --.

IN THE CLAIMS:

Col. 14, line 43: after "buoy" delete -- , --.
Col. 13, line 66: after "sub-chambers" delete -- , --.

Col. 11, line 45: change "subchambers" to -- sub-chambers --

Signed and Sealed this

Twenty-fifth Day of July 1978

[SEAL]

*Attest:*

RUTH C. MASON
*Attesting Officer*

DONALD W. BANNER
*Commissioner of Patents and Trademarks*